Jan. 12, 1954

J. R. HANSEN
WATER FLOW REGULATOR

2,665,706

Filed Jan. 7, 1952

INVENTOR.
Joseph R. Hansen
BY
Webster & Webster
Attorneys

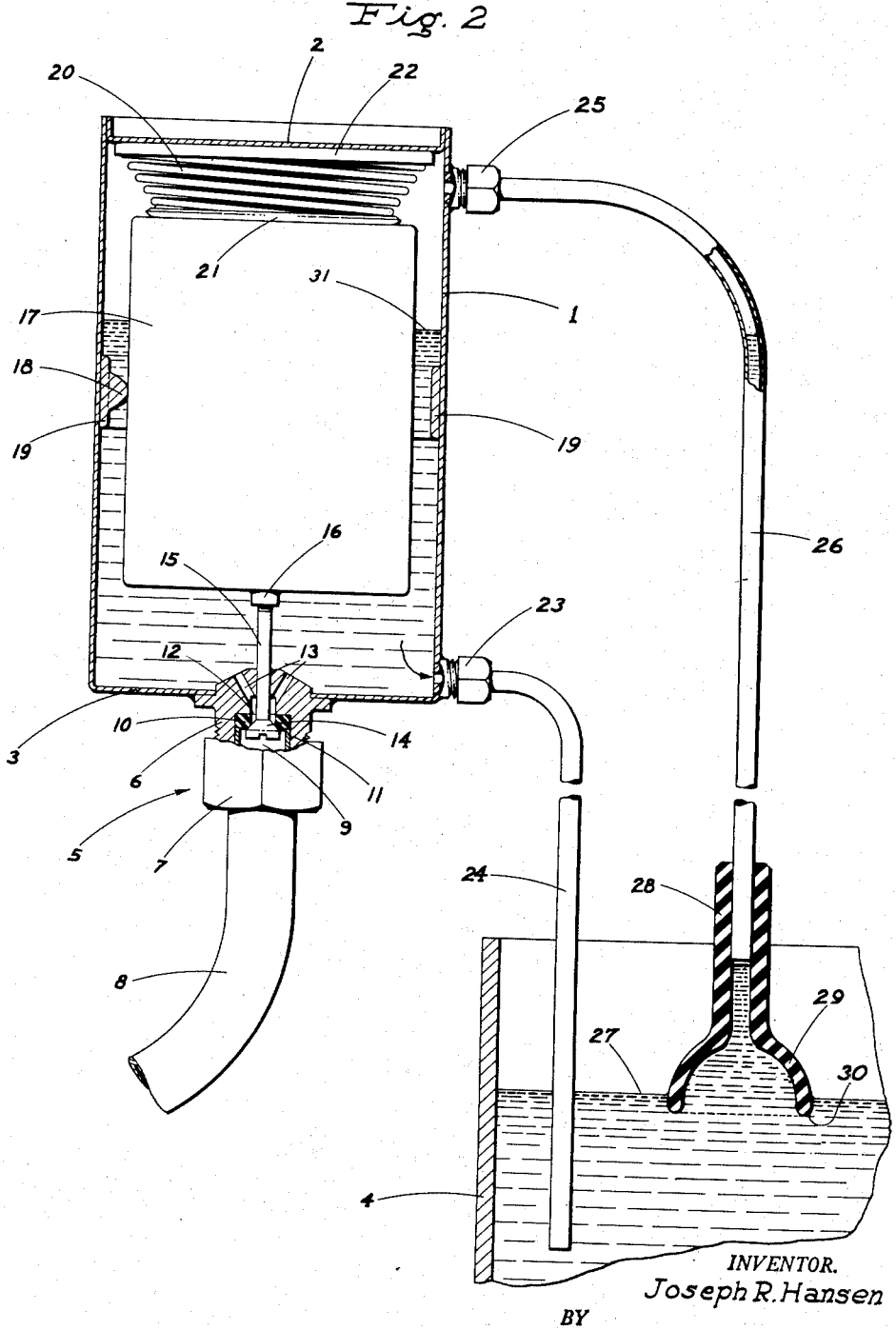

Patented Jan. 12, 1954

2,665,706

UNITED STATES PATENT OFFICE 2,665,706

WATER FLOW REGULATOR

Joseph R. Hansen, Kingsburg, Calif.

Application January 7, 1952, Serial No. 265,250

6 Claims. (Cl. 137—393)

This invention is directed to, and it is an object to provide, a novel water flow regulator for poultry drinking troughs or the like; the device being operative to maintain a supply of water in the trough with the variable surface levels within close limits.

Another important object of the present invention is to provide a water flow regulator which functions positively, smoothly, and effectively for the purpose of maintaining a supply of water in a poultry drinking trough or the like without the use of an exposed, valve control float in such trough; the movable working parts of the present device being enclosed and thus protected against damage, or mal-functioning on account of dirt accumulating thereon.

An additional object of the invention is to provide a water-flow regulator which includes a water supply valve controlled by a float enclosed within a tank, and the float being arranged to lower and open the valve only in response to opening of a breather pipe leading to said tank, and which breather pipe opens only upon predetermined drop in the water level in the drinking trough.

It is also an object of the present invention to provide a water flow regulator designed for ease and economy of manufacture, which regulator can be installed readily in connection with new or existing poultry drinking troughs or the like.

A still further object of the invention is to provide a practical and reliable water flow regulator, and one which is exceedingly effective for the purpose for which it is designed.

These objects are accomplished by means of such structure and relative arrangement of parts as will fully appear by a perusal of the following specification and claims.

In the drawings:

Fig. 2 is a similar view, but shows the valve in closed position.

Figure 1:
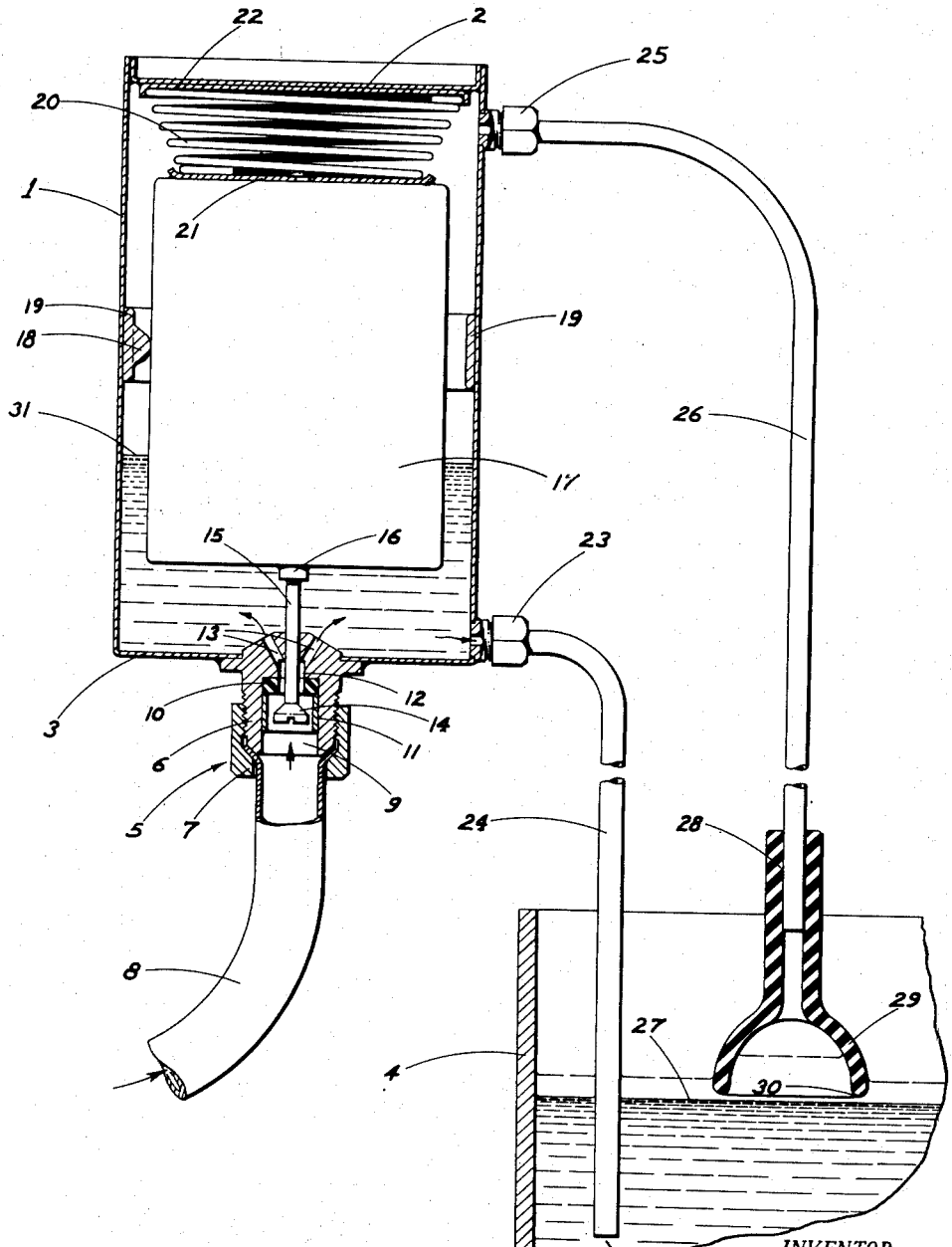
Fig. 1 is a sectional elevation of the water flow regulator as arranged with a poultry drinking trough; the valve being shown in open position.

Referring now more particularly to the characters of reference on the drawings, the novel water flow regulator comprises a vertically elongated, relatively small cylindrical tank 1 which includes a top 2 and a bottom 3; such tank being mounted by suitable means (not shown) in a position adjacent but above the poultry drinking trough or the like, indicated at 4. A pipe fitting, indicated generally at 5, is secured centrally to the bottom 3 of the tank 1; such fitting including a cylindrical body 6 fixed to the bottom 3, opening through the latter, and projecting axially a distance therebelow. The projecting portion of the body 6 is fitted with a nut 7 which secures the adjacent end of a water supply pipe 8 to the fitting 5 in communication with a lower bore 9 therein.

A resilient annular valve seat 10 is engaged in the upper end of the lower bore 9, being retained in place by a holding sleeve 11.

In the body 6 above the annular valve seat 10, and in matching communication therewith, is a reduced-diameter upper bore 12, and a pair of ducts 13 open through the body 6 from the upper bore 12 into the tank 1.

A taper plug valve 14 works into the annular valve 10 from below, and such valve includes an upwardly projecting valve stem 15 which extends in slidable relation through the body 6 into the tank 1. At its upper end the stem 15 is fixed, as at 16, centrally to the lower end of an enclosed cylindrical float 17 in tank 1.

The float 17 is not only considerably shorter in axial extent than the tank 1, but is of lesser diameter; said float being guided in the tank 1 for up and down floating motion by circumferentially spaced guide nubs 18 on a mounting ring 19 fixed in said tank 1.

A relatively light-duty, helical compression spring 20, of substantial diameter, engages between the upper end of the float 17 and the top 2; such spring being retained against lateral displacement by seating at opposite ends in retention cups 21 and 22.

The purpose of the light-duty compression spring 20 is to assure that the valve 14 will open against the pressure of the water in pipe 8 upon lowering of the water level in the tank 1, as will hereinafter appear.

On one side and adjacent the bottom the tank has a fitting 23 thereon, establishing communication between the interior of said tank and a small-diameter water feed pipe 24, which said fitting attaches to the tank. From the fitting 23 the water feed pipe 24 turns downwardly and depends into the poultry drinking trough 4.

The inside diameter of the water feed pipe 24 is substantially the same diameter as one of the ducts 13; this to the end that only approximately half of the water which feeds from said ducts 13 can deliver through the pipe 24; the other half flowing into the tank 1 to raise the float 17.

Adjacent the top, and on the same side as the fitting 23, the tank 1 is provided with another fitting 25 which establishes communication between the interior of the tank above the float and a small-diameter breather pipe 26. The fitting 25 supports the breather pipe 26 so that the latter may extend outwardly and thence turn and depend into the trough 4. The water feed pipe 24 terminates at its lower end below the water level 27 in the trough, while the breather pipe 26 terminates at its lower end a distance above said water level.

The lower end portion of the breather pipe 26 is engaged, in vertically adjustable relation, by an upstanding neck 28 of an enlarged inverted cup 29 on the lower end of said neck; the latter and said cup being integral and of a resilient material, such as rubber.

The lower edge 30 of the inverted cup 29 is rounded and is normally disposed slightly below the water level 27.

When the valve 14 is initially opened, the water level 31 in the tank 1 is low, as in Fig. 1, while such level is high, as in Fig. 2, when said valve is closed.

In operation of the above described water flow regulator the valve 14 is initially open so that water flows through the ducts 13, substantially half of the water delivering through the water feed pipe 24 into the trough 4, while the other half of the water is retained in the tank 1, causing progressive raising of the float 17 until the valve 14 closes.

The upstanding neck 28 is pre-adjusted to establish a selected water level 27, and when the valve 14 closes by raising of the float 17, the rounded lower edge 30 of the inverted cup 29 is immediately adjacent but slightly below the water level 27 (see Fig. 2).

Thereafter, the water from the tank 1, which water is holding the float 17 raised and the valve 14 closed, cannot displace downwardly through the water feed pipe 24 by reason of a vacuum lock effect in the tank 1 above the water level 31 therein. This vacuum lock effect is occasioned or maintained by the suction attraction of water from the trough 4 a distance into the inverted cup 29 and the small diameter breather pipe 26 equal to the height of water in tank 1, as shown in Fig. 2.

This suction attraction of the water into the inverted cup 29 will persist until the water level 27 drops a distance below normal, which drop is caused by poultry drinking from the trough 4, evaporation, etc.

Upon such drop in the water level occurring, the water breaks out of the inverted cup 29 due to the enlargement thereof (see Fig. 1), thereby breaking the balance. Air then enters said cup and flows through the breather pipe 26, forcing the water in breather pipe 26 into tank 1 and relieving the vacuum lock in the upper end of the tank 1.

When this occurs water flows from the tank 1, through the water feed pipe 24, into the trough 4, and at the same time the float 17 lowers and the valve 14 opens, so that the foregoing cycle is repeated.

With the described water flow regulator the water level 27 in trough 4 is maintained within reasonably close limits and as the device embodies no exteriorly accessible movable parts, such a movable float in the trough 4, the device is capable of functioning automatically for a long period without manual attendance, as damage or fouling of said parts is unlikely.

From the foregoing description it will be readily seen that there has been produced such a device as substantially fulfills the objects of the invention, as set forth herein.

While this specification sets forth the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A water flow regulator, adapted to recurringly replenish water in a trough up to a given level, comprising an enclosed tank adapted to be mounted adjacent the trough extending above said level, a water feed conduit communicating between a lower portion of the tank and the trough, a separate breather pipe communicating between an upper portion of the tank and a point in the trough closely adjacent but below said level, said breather pipe opening downwardly at its lower end, a water supply pipe, a valve unit connected between the water supply pipe and the tank, and a float in the tank connected in operative relation to the valve to close the same upon the float being raised in the tank by water therein; the valve unit allowing a greater water input into the tank than the capacity of the feed pipe.

2. A water flow regulator, adapted to recurringly replenish water in a trough up to a given level, comprising an enclosed tank adapted to be mounted adjacent the trough extending above said level, a water feed conduit communicating between a lower portion of the tank and the trough, a separate downwardly opening breather pipe communicating between an upper portion of the tank and a point in the trough adjacent said level, a water supply pipe, a valve unit connected between the water supply pipe and the tank, a float in the tank connected in operative relation to the valve to close the same upon the float being raised in the tank by water therein, and an inverted cup on and depending from the lower end of the breather pipe, the lower edge of said cup being slightly below said given level.

3. A water flow regulator, as in claim 2, in which the inverted cup is vertically adjustably secured on the breather pipe.

4. A water flow regulator, as in claim 3, in which the inverted cup includes an upwardly projecting neck thereon, said neck being of flexible and resilient material and having the adjacent portion of the breather pipe frictionally engaged therein.

5. A water flow regulator, adapted to recurringly replenish water in a trough up to a given level, comprising an enclosed tank adapted to be mounted adjacent the trough extending above said level, a water feed conduit communicating between a lower portion of the tank and the trough, a separate breather pipe communicating between an upper portion of the tank and a point in the trough closely adjacent said level, said breather pipe opening downwardly at its lower end, a water supply pipe, a valve unit positioned between the water supply pipe and the tank, and a float in the tank positioned in operative relation to the valve whereby said valve is closed when the float is raised in the tank by the water therein, the valve unit allowing a greater water input into the tank than the capacity of the feed pipe.

6. A water flow regulator, as in claim 5, and including an inverted cup depending from the lower end of said breather pipe and adjustably mounted thereon for regulating said level of water.

JOSEPH R. HANSEN.

References Cited in the file of this patent

UNITED STATES PATENTS

| Number | Name | Date |
| --- | --- | --- |
| 1,020,642 | Elkofer | Mar. 19, 1912 |
| 1,150,013 | Bordo | Aug. 17, 1915 |
| 2,588,567 | Perlman | Mar. 11, 1952 |

FOREIGN PATENTS

| Number | Country | Date |
| --- | --- | --- |
| 5,142 | Great Britain | Mar. 11, 1905 |